United States Patent Office 2,908,817
Patented Oct. 13, 1959

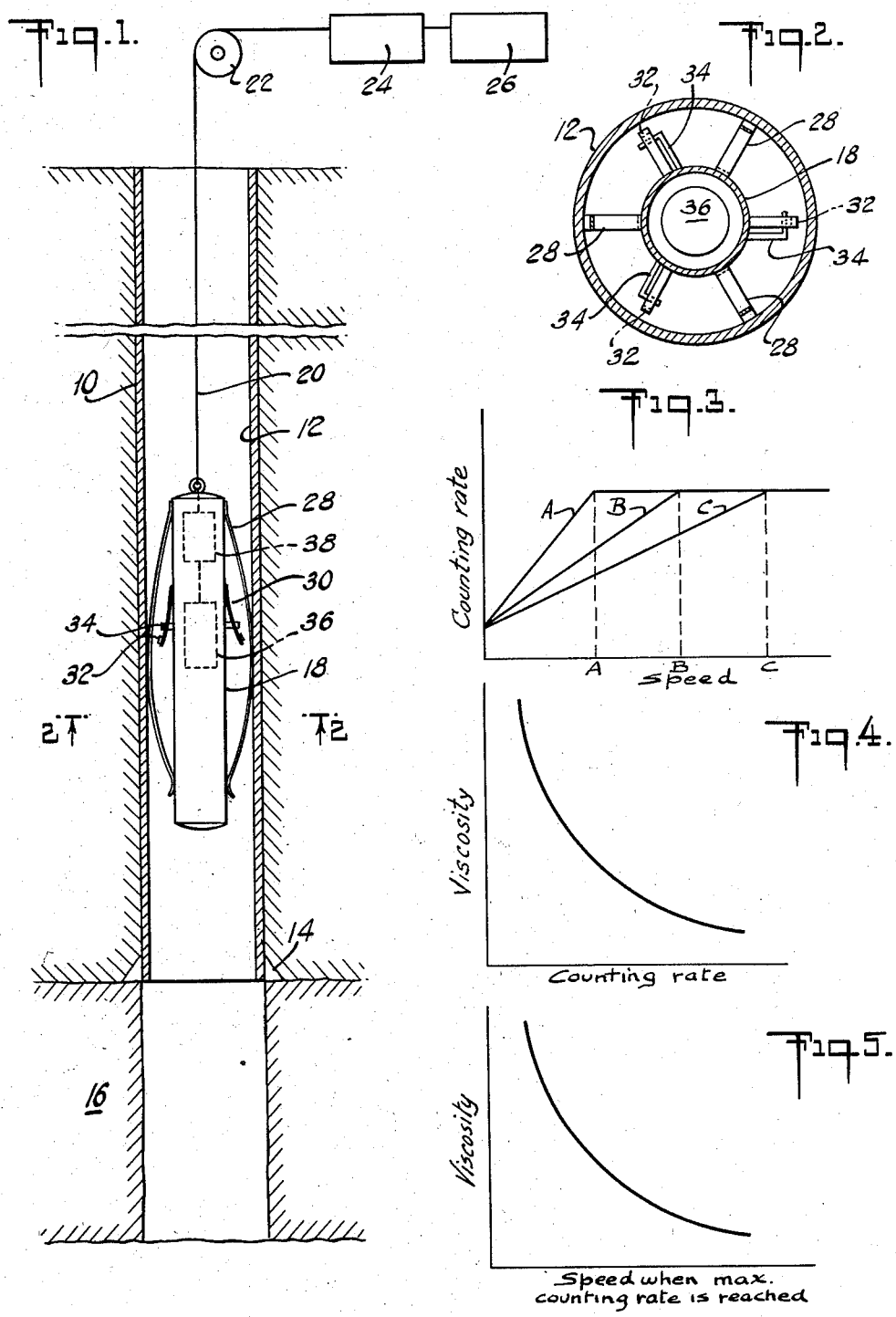

2,908,817

MEASUREMENT OF VISCOSITY

Alexander S. McKay, Bellaire, Tex., assignor to Texaco Inc., a corporation of Delaware Application June 24, 1954, Serial No. 438,972

11 Claims. (Cl. 250—43.5)

This invention relates to a method and an apparatus for measuring the viscosity of a fluid and more particularly to the making of such a measurement in relatively inaccessible locations, for example, in a well bore or in a high pressure or high temperature flow line.

It is frequently necessary or desirable to measure the viscosity of a fluid in a location where it is difficult or impossible to have access. For example, it is often desirable to measure the viscosity of the drilling mud in a well or bore hole, and since many of these wells are several thousand feet in depth, it would obviously be difficult to obtain a sample or specimen of the drilling mud at such a depth. Again, it is frequently necessary to measure the viscosity of a fluid passing through a high pressure or high temperature flow line and where the conventional or ordinary methods of making viscosity measurements are not practicable.

In accordance with the invention, a method and an apparatus are provided, which involve the measurement of the intensity of penetrative radiation in such a manner that the measurement of variations in this intensity will be indicative of the viscosity of a fluid at the point where the measurement is being made. In carrying out the invention, an instrument has been provided which can be pulled through a column of the fluid or liquid, the viscosity of which is to be measured, or which can be placed in a fixed position within a pipe or conduit, through which the fluid or liquid is flowing.

The apparatus comprises essentially an elongated sealed housing or tube containing a detector of penetrative radiation, such as gamma rays, and means for preamplifying the output from said detector, the instrument in one embodiment being attached to a conductor cable so that it can be lowered or raised through a well or bore hole containing drilling fluid or drilling mud. Attached to the outside of the housing is at least one, and preferably a plurality, of resilient or spring members, each of which is affixed to the outer surface of the housing at one end, the springs being preferably preformed so that they will normally curve outwardly away from the housing. A small source of penetrative radiation, such as gamma rays, is attached to the outer end of each of the springs, and means are provided for limiting the outward movement of the springs so that normally the radioactive source is maintained at a predetermined distance from the housing and thus from the detector contained within the housing. Means are also provided for centering the housing within the casing or walls of the bore hole in such a manner that in their outmost position the small radioactive sources will not contact the casing or walls. When the instrument is pulled through the bore hole, or, in fact, any other container full of a liquid, the viscosity of which is to be measured, the spring members will move inwardly toward the housing and the detector by a distance which will depend upon the viscosity of the liquid and the speed at which the instrument is moved through the container. The output of the detector is preferably passed through the conductor cable to the surface where it may be amplified again and then passed to a suitable indicating or recording device. Assuming that the instrument is pulled upwardly through a bore hole containing mud fluid, the recorded output of the radiation detector, when proper calibrations have been made, will provide a measure of the viscosity of the mud fluid.

For a better understanding of the invention, reference may be had to the accompanying drawing in which:

Fig. 1 is a vertical, sectional elevation through a portion of a well or bore hole with an instrument embodying the invention shown as suspended therein;

Fig. 2 is a cross sectional view on the line 2—2 of Fig. 1 looking in the direction of the arrows; and Figs. 3, 4 and 5 are curves which will illustrate the operation of the invention.

Referring to the drawing, a well or bore hole 10 is shown as provided with a casing 12 cemented in place at 14 above a producing formation 16. Shown as suspended within the bore hole is an instrument housing 18 comprising an elongated, tubular member sealed at its end and suspended from a conductor cable 20. The cable 20 passes upwardly over a suitable drum and cable measuring device 22 and then to an amplifier 24, the output of which is shown as conducted to a suitable indicating or recording device 26. Means are provided for centering the instrument 18 within the bore hole, these means comprising preferably a plurality of spring members 28, shown as attached at their upper ends to the upper end of the housing, and contacting, but free to move along the exterior of the lower end of the housing. These springs 28 bear against the inner surface of casing 12 or the walls of the bore hole and maintain the instrument in a substantially mid-position within the hole at all times. Also attached to the outside of the housing 18 at substantially a mid-position are a plurality of thin, resilient or spring members 30, each of these springs being shown as attached at one end to the housing and being formed so that they curve outwardly and away from the outer surface of the housing. At the outer end of each spring member 30 is a small source of penetrative radiation such as a small amount of a radioactive gamma ray emitting substance 32. In order to limit the outward motion of the springs 30, a stop or bracket 34 extends laterally outwardly from the housing and serves as a stop or abutment for each spring. Within the housing 18 and substantially opposite the sources of radiation 32 is a detector 36 of penetrative radiation, e. g., gamma rays, this detector being connected to a suitable preamplifier 38, the output of which is led upwardly through the cable 20 to the amplifier 24 and recording means 26.

The springs 30 are designed to have a tension such that when the instrument 18 is pulled upwardly through the bore hole 10, the outer ends of the springs and thus the radiation sources 32 will tend to move inwardly toward the housing 18 and the detector 36 by an amount which will depend upon the viscosity of the fluid, such as the drilling mud within the hole, and also the speed at which the instrument is pulled through the fluid.

It is believed that the operation of the apparatus which has been described will be apparent from the foregoing description. It may, however, be repeated that when it is desired to measure the velocity of the drilling mud in a bore hole, the instrument 18 is first lowered downwardly, either to the bottom or to any predetermined depth within the hole. The device is then pulled upwardly through the hole at a constant speed. While the instrument is at the bottom of the hole and before it starts to move upwardly, the recorder 26 will indicate a minimum response from the detector 36, since at that time the sources 32 will be in their outermost position or at the maximum distance from the detector 36 as limited only by the stop or bracket members 34. When the instrument is moving upwardly through the fluid, however, the springs 30 tend to straighten out and the sources 32 will move closer to the detector 36 which will, of course, show a greater response and which will be indicated at the recorder 26.

After the instrument has been constructed, as has been described, it should be calibrated to show counting rate of the detector as a function of viscosity. To do this, the instrument can be moved through several different liquids, one at a time, each liquid having a different and known viscosity. In each instance the tool should be moved through a liquid at the same speed as it is moved through the other liquids, and the densities of the liquids should be the same. Instead of moving the tool through liquids which are held in stationary containers, the tool could be located in a fixed position in a pipe and first one liquid and then another forced past the tool, the speeds of the liquids and the densities being the same, as indicated above. A series of curves can be made from this data, each curve showing counting rate as a function of viscosity for one speed of relative movement between the instrument and one liquid. To make a measurement of the unknown viscosity of a liquid, the instrument can then be pulled through the liquid at a uniform speed and reference made to the curve of viscosity as a function of counting rate for that particular speed, one of these curves being shown in Fig. 4.

In a slightly different embodiment of the invention, the instrument can be pulled through different liquids, each having a known viscosity, the detector being moved through each liquid at a gradually increasing speed while observing the counting rate of the detector. It will be found that the counting rate for a liquid of higher viscosity, indicated by the curve A in Fig. 3, reaches its maximum value, i.e., when the radiation sources 32 are moved inwardly into contact with the housing 18, at a slower speed than when moving through a liquid having lower viscosities, such as indicated at B and C of Fig. 3. From the data thus obtained, a curve can be prepared such as in Fig. 5, showing viscosity as a function of the speeds required for maximum counting rate to be attained. The instrument can then be pulled through a liquid having an unknown viscosity at a gradually increasing speed and the speed determined at which the maximum counting rate is reached. Reference may then be made to the curve of Fig. 5 and the viscosity determined.

While in most of the foregoing description reference is made to the measurement of viscosity of a stationary liquid in a container such as drilling mud in a bore hole, it is to be understood that this is by way of example only, and that the instrument can be mounted in a fixed position in any pipe or conduit through which a liquid having an unknown viscosity is flowing past the instrument. This is particularly useful when the liquid is in a high pressure or high temperature flow line where it is difficult, if not impossible, to measure the liquid viscosity by conventional means.

While metallic spring members 30 have been illustrated and described, it is also to be understood that these members may be formed of suitable fibrous materials, plastics or the like, it merely being necessary that these members have some resilience and be preformed so that when there is no movement between the liquid and the instrument, the radiation sources 32 will be held in an outward position away from the housing 18 and the detector 36, but so that they will be capable of movement toward the housing and detector when there is a relative movement between the instrument and the liquid to be measured.

Obviously, many other modifications and variations of the invention as hereinbefore set forth may be made without departing from the spirit and scope thereof and therefore only such limitations should be imposed as are indicated in the appended claims.

I claim:

1. An instrument for measuring a characteristic of a fluid in a container, comprising a sealed housing, means for moving said housing linearly through said container, at least one flexible resilient strip member attached at one end to the outer surface of said housing, said strip member being disposed in a plane intersecting the longitudinal axis of said housing and being formed so that its unattached end will be biased outwardly from said housing, stop means for restricting the outward movement of said unattached end to a predetermined maximum distance, guide means attached to the housing for maintaining at least that portion of the housing opposite said unattached end spaced from the inside of the container at least said predetermined distance as the housing is moved through the container, a source of penetrative radiation on the said unattached end of said strip and detector means within said housing responsive to variations in the intensity of said radiation as said source moves toward or away from said housing.

2. An instrument for measuring a characteristic of a fluid in a container, comprising a sealed housing, a detector of penetrative radiation in said housing, means for moving said housing linearly through said container, at least one flexible resilient strip member attached at one end to the outer surface of said housing, said strip member being disposed in a plane intersecting the longitudinal axis of said housing and being formed so that its unattached end will be biased outwardly from said housing, stop means for restricting the outward movement of said unattached end to a predetermined maximum distance, a source of penetrative radiation on the said unattached end of said strip and guide means attached to the housing and adapted to contact the inner surface of said container for spacing the housing from said inner surface by at least said minimum distance while the housing is being moved through the container, the arrangement being such that as the instrument is moved through the container the source of radiation will assume a position at a distance from the detector depending upon the characteristic of the fluid being measured.

3. An instrument as described in claim 1 in which said container is the casing of a bore hole and said fluid is drilling mud.

4. An instrument for measuring the viscosity of a fluid within a container which comprises a detector of penetrative radiation, a resilient member extending from said instrument and adapted and arranged to be maintained in a stream of fluid moving past said instrument, said member including a surface of sufficient area in at least one plane intersecting a given direction of fluid movement relative to the instrument to undergo significant pressure due to said fluid movement, a portion of said member including a source of penetrative radiation, said portion of the member being free to move toward the detector in response to pressure on said member caused by fluid flowing past said instrument in a given direction, the resiliency of said member tending to oppose movement of said portion due to the fluid flow, and means for providing a signal display indicative of the quantity of radiation reaching said detector from the source as an indication of the viscosity of fluid flowing past the instrument for a given fluid flow rate.

5. Apparatus for measuring the viscosity of a fluid within a container which comprises an instrument including a detector of penetrative radiation, means for moving said instrument through the container at a predetermined constant velocity, a resilient member extending from said instrument and adapted and arranged to be maintained in a stream of fluid through which said instrument is moving, a portion of said member including a source of penetrative radiation, said portion of the member being free to move toward the detector in response to pressure on said member caused by fluid flowing past said instrument in a given direction, the resiliency of said member tending to oppose movement of said portion due to the fluid flow, means for providing a signal display indicative of the quantity of radiation reaching said detector from the source as an indication of the viscosity of fluid flowing past the instrument for a given fluid flow rate, and means for preventing said resilient member from contacting the side of the container as the instrument is moved through the fluid.

6. Apparatus for measuring a characteristic of a fluid which comprises a source of radiation, a detector exposed to radiation resulting from the source, means for varying the intensity of the radiation reaching the detector as a result of said source, said means including a pressure sensing member having a surface adapted and arranged to be exposed to fluid moving relative to said instrument, said surface being of sufficient area in at least one plane intersecting a given direction of fluid movement relative to the instrument to undergo significant pressure due to said fluid movement, at least a portion of said member being resiliently mounted for movement in response to said pressure on said member caused by said fluid movement, the resilient mounting of said member being such that the movement of at least said portion of said member is in proportion to said pressure on the member due to the fluid movement, and means for providing a signal display indicative of the intensity of radiation reaching said detector due to said source as an indication of the pressure exerted against said member by fluid movement relative to the instrument in said given direction, in order to provide for evaluation of a characteristic of the fluid.

7. Apparatus for measuring a characteristic of a fluid which comprises a source of radiation, a detector exposed to radiation from the source, means for varying the distance between the source and the detector, said means including a pressure sensing member adapted and arranged to be maintained in a stream of fluid moving relative to said instrument and including a surface exposed to significant pressure due to fluid flow past the instrument in a given direction, at least a portion of said member being resiliently mounted for movement in response to pressure on said member caused by fluid flowing past the instrument in said given direction, the resiliency of said mounting tending to oppose said movement of said portion due to the fluid flow, and means for providing a signal display indicative of the intensity of the radiation reaching said detector from said source as an indication of the pressure exerted against said member by fluid flow relative to the instrument in said given direction, in order to provide for evaluation of a characteristic of the fluid.

8. Apparatus for measuring a characteristic of a fluid in a container which comprises an instrument adapted to be submerged in the fluid within said container, a pressure sensing member resiliently mounted with respect to said instrument so that at least a portion of said sensing member is movable with respect to said instrument, said sensing member being exposed to said fluid when said instrument is submerged therein, the resilient mounting of said sensing member being such that relative movement of said instrument with respect to said fluid effects movement of said movable portion of said sensing member solely by the pressure exerted by said fluid against said sensing member, a detector of penetrative radiation, and a source of penetrative radiation operatively coupled to said detector through said movable portion of the sensing member such that the intensity of penetrative radiation reaching said detector from said source is dependent upon the relative position of said movable portion of the sensing member with respect to said instrument.

9. The apparatus of claim 8 further including means apart from said container for limiting the extent of movement of said movable portion.

10. Apparatus according to claim 8 which comprises an elongated instrument having a plurality of said resilient members mounted to the instrument around the longitudinal axis thereof opposite said detector.

11. An instrument for measuring a characteristic of a fluid within a container which comprises a source of penetrative radiation, a detector of penetrative radiation, a resilient pressure sensing member extending from said instrument and adapted and arranged to be maintained in a stream of fluid moving past said instrument, said member including a surface of sufficient area in at least one plane intersecting a given direction of fluid movement relative to the instrument to undergo significant pressure due to said fluid movement, at least a portion of the member being free to move in response to pressure on said member caused by fluid flowing past said instrument in a given direction, the resiliency of said member tending to oppose movement of said portion due to the fluid movement, means including said portion of the member for varying the distance between the source and the detector as a function of the position of at least said portion of said member, and means for providing a signal display indicative of the quantity of radiation reaching said detector from the source as an indication of the pressure exerted against said member by the movement of said fluid relative to the instrument in order to provide for evaluation of a characteristic of the fluid.

References Cited in the file of this patent

UNITED STATES PATENTS

| | | |
|---|---|---|
| 2,385,378 | Piety | Sept. 25, 1945 |
| 2,469,461 | Russell | May 10, 1949 |
| 2,725,486 | Walstrom | Nov. 29, 1955 |